United States Patent [19]

Travalee

[11] Patent Number: 5,012,641
[45] Date of Patent: May 7, 1991

[54] EMISSIONS CONTROL SYSTEM FOR USE IN CONJUNCTION WITH AN IC ENGINE PRIMARY EMISSIONS CONTROL SYSTEM

[76] Inventor: Lucy M. Travalee, 2439 Consaul Rd., Schenectady, N.Y. 12304

[21] Appl. No.: 362,945

[22] Filed: Jun. 8, 1989

[51] Int. Cl.$^5$ .......................... F01N 3/02; F02B 35/00
[52] U.S. Cl. .......................................... 60/297; 60/295; 60/311; 60/315
[58] Field of Search ................... 60/297, 315, 295, 311

[56] References Cited

U.S. PATENT DOCUMENTS

| | | | |
|---|---|---|---|
| 2,673,446 | 3/1954 | Salardi | 60/297 |
| 2,787,119 | 4/1957 | Giambruno | 60/297 |
| 3,034,290 | 5/1962 | Gary . | |
| 3,083,084 | 3/1963 | Raymond . | |
| 3,107,484 | 10/1963 | Touhey . | |
| 3,236,344 | 2/1966 | Wawrzinick . | |
| 3,287,899 | 11/1966 | Bintz . | |
| 3,548,591 | 12/1970 | McKay | 60/315 |
| 3,737,515 | 6/1973 | Veloso | 60/315 |
| 3,988,113 | 10/1976 | Roberts | 60/297 |
| 4,372,111 | 2/1983 | Virk | 60/297 |

Primary Examiner—Douglas Hart
Attorney, Agent, or Firm—Terry M. Gernstein

[57] ABSTRACT

An apparatus which is adapted to be retrofit onto a tailpipe of an internal combustion engine co-operates with the primary emissions control system of the engine to improve the overall performance of such control system. The apparatus includes a housing having an inlet connected to the tailpipe of the engine, and an exhaust gas treatment device in fluid communication with such inlet. Overall fluid pressure drop in the system is controlled by a fan which is powered by a motor mounted on the housing. The motor is powered by the engine, and is controlled according to pressure in the exhaust manifold of the engine. The exhaust treatment apparatus can include various elements, such as baffles, charcoal or particulate material.

2 Claims, 1 Drawing Sheet

EMISSIONS CONTROL SYSTEM FOR USE IN CONJUNCTION WITH AN IC ENGINE PRIMARY EMISSIONS CONTROL SYSTEM

TECHNICAL FIELD OF THE INVENTION

The present invention relates to the general art of Internal Combustion Engines, and to the particular field of emission controls for such Engines.

BACKGROUND OF THE INVENTION

Emissions of hydrocarbons and other products of incomplete combustion have become a serious problem in connection with air pollution. This problem has been the subject of extensive research and has led to many proposals for emissions control systems for use in conjunction with Internal Combustion Engines.

Problems associated with emissions control are present in all internal combustion engines, but are especially troublesome in older engines which may be less efficient than newer engines. Of course one remedy for this problem would be to simply replace the emissions control system in all older internal combustion engines, especially those in vehicles. However, this remedy may prove to be too costly to be worthwhile.

As air pollution becomes ever more important, the standards for emissions of all vehicles, especially automobiles, are made increasingly strict. Some older vehicles may not be able to meet the stricter standards, and even some new cars may have an emissions control system that is prohibitively expensive in order to meet the strict emissions control standards of many states.

While there have been many proposals for the primary emissions control system, itself, there is still a need for a cost-effective means for either improving the efficiency of the overall emissions removal or for maintaining satisfactory emissions control even if the primary emissions control system should suffer a degradation in performance or for improving the overall efficiency of the emissions control of the vehicle in order to meet standards that have been made stricter after the vehicle was originally sold. At the present time, newer, and stricter, emissions control standards are often written to exclude older vehicles. Such exclusion can vitiate the advantages gained by such stricter standards.

OBJECTS OF THE INVENTION

It is a main object of the present invention to provide an emissions control system which will be usable in conjunction with a primary emissions control system of an internal combustion engine to improve the overall efficiency and performance of the overall emissions control of the engine.

It is another object of the present invention to provide an emission control system which can be retrofit onto a vehicle having a primary emissions control system.

It is another object of the present invention to provide an emissions control apparatus that is easily modified.

It is another object of the present invention to provide an emissions control system which will co-operate with an internal combustion engine to provide the efficient emissions control.

SUMMARY OF THE INVENTION

These, and other, objects are achieved by providing an apparatus which is adapted to be connected to the tailpipe of an internal combustion engine exhaust system downstream of any primary emissions control apparatus associated with that internal combustion engine.

The apparatus includes means for maintaining proper fluid flow through the exhaust system and has controls that are associated with the exhaust manifold of the engine for ensuring such proper flow control.

In this manner, the apparatus of the present invention can be retrofit onto a vehicle, such as an automobile, or the like, to improve the overall efficiency of any in-place emissions control system associated with such engine. Older vehicles can thus have their emissions control system upgraded to meet new, stricter, laws, and newer vehicles can have their emissions control systems upgraded to meet varying standards in different states.

DETAILED DESCRIPTION OF THE PREFERRED EMBODIMENT OF THE INVENTION

Figure 1:
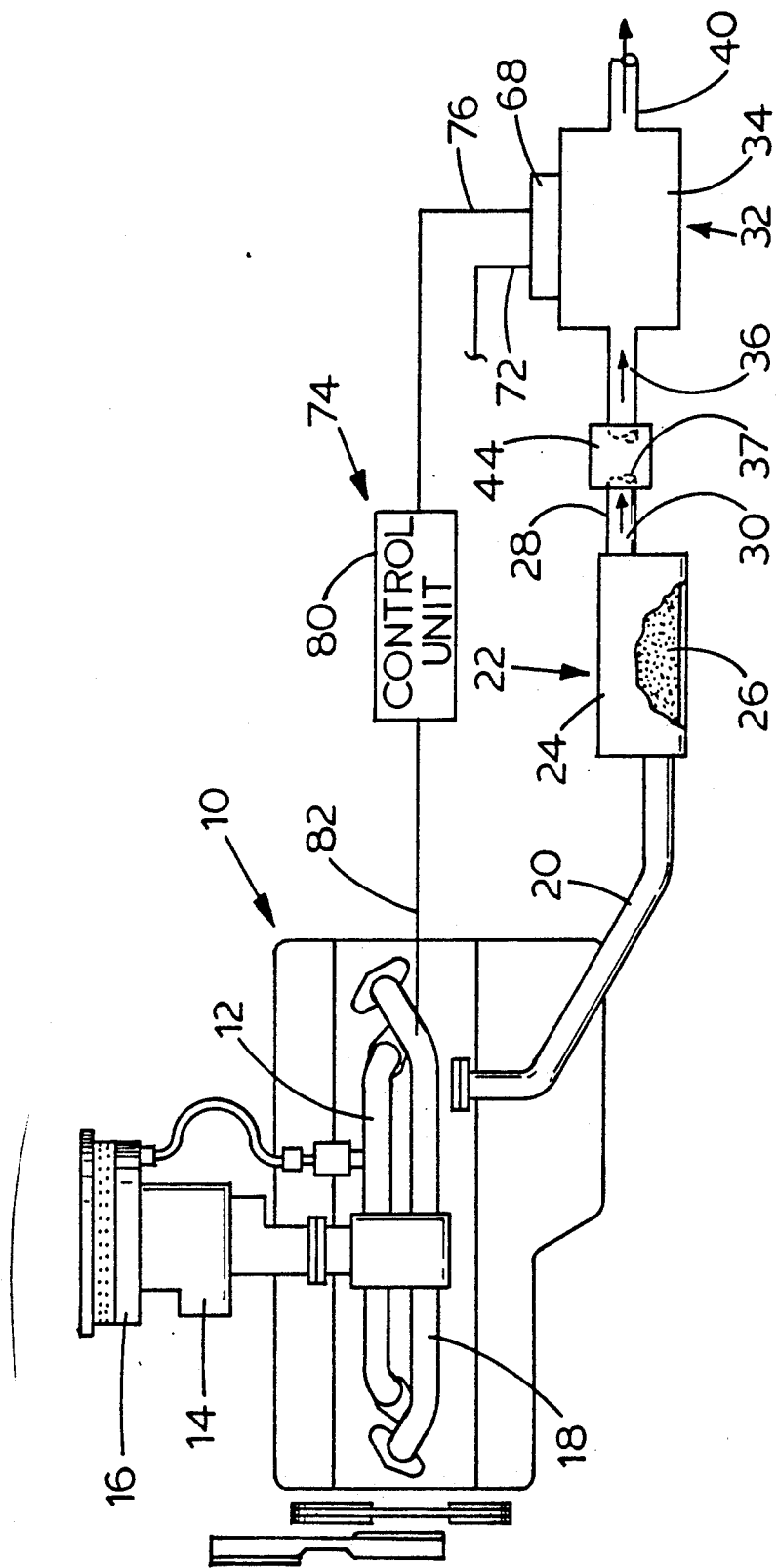
FIG. 1 is a schematic showing the apparatus embodying the present invention in conjunction with an internal combustion engine.

Shown in FIG. 1 is an internal combustion engine 10 which can be associated with a land or marine vehicle or the like. The engine 10 includes an intake system comprising an intake manifold 12, a carburetor 14 connected to the intake manifold, and the usual air cleaner or filter unit 16 attached to the carburetor. The engine 10 has an exhaust system comprising an exhaust manifold 18 from which an exhaust pipe 20 extends. The engine also includes a primary emissions control system 22 which includes a catalytic converter 24 in the exhaust pipe 20. The catalytic converter will include the usual catalyst material 26 and will have a tailpipe 28 fluidically connected to an outlet thereof for conducting treated exhaust gases to the atmosphere.

The exhaust gases from the primary emissions control system are indicated in FIG. 1 by the arrow 30, and would, in the normal course, be released to the atmosphere. However, the present invention contemplates improving the efficiency of such emissions control system by retrofitting the vehicle with an apparatus that is adapted to operate on the emissions controlled exhaust gases 30. Such an apparatus is indicated in FIGS. 1 and 2 by the reference indicator 32.

The apparatus 32 includes a housing 34 having an inlet conduit 36 fluidically connected to outlet 37 of the tailpipe 28 to receive treated gases therefrom, and an outlet conduit 40 for releasing the double-treated exhaust gases to the atmosphere. A releasable coupling means 44, such as a clamp, threaded collar or the like, is used to couple the apparatus 32 to the tailpipe 28. In this manner, exhaust gases from the engine 10 are first treated by the primary emissions control apparatus 22 and are again treated by the apparatus 32 before being finally released to the atmosphere.

Figure 2:
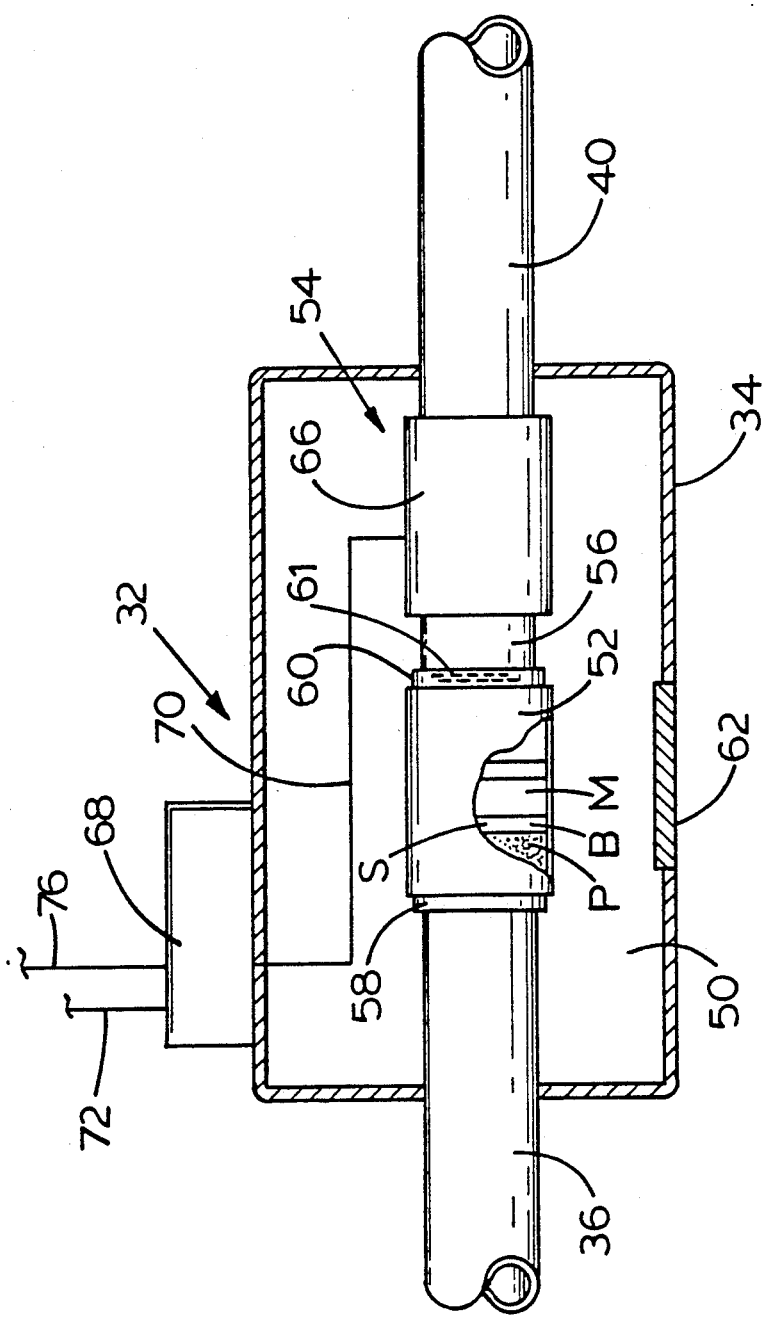
FIG. 2 is a schematic showing the apparatus embodying the present invention.

The apparatus 32 is best shown in FIG. 2, and attention is now adverted thereto. The housing 34 is tubular to include a central chamber 50 with the inlet conduit 36 and the outlet conduit 40 both extending through the housing into such chamber. The inlet conduit 36 is fluidically associated with the outlet conduit 40 by an exhaust gas treatment means 52 and an exhaust gas flow control means 54 which are fluidically connected together by a connecting conduit 56. The treatment means 52 includes a cartridge that is removably attached to the inlet conduit by a coupling means 58 and to the connecting conduit 56 by a coupling means 60. These coupling means can include threads 61 which cooperate with mating threads on the inlet conduit 36 and on the connecting conduit 56, respectively, and are used to remove the treatment means 52 to replace it with another treatment means as necessary to further improve the performance of the overall exhaust gas treatment system, and can also include bayonet-type couplings or the like. The treatment means 52 will be further discussed below.

An access door 62 is located in the housing so that access to the chamber 50 and to the treatment means 52 is provided so that treatment means can be removed and replaced as necessary.

The flow control means 54 includes a fan 66 fluidically interposed between the connecting conduit 56 and the exhaust conduit 40. The fan is used to decrease the pressure drop between the tailpipe 28 and the exhaust conduit 40 by an amount commensurate with the pressure drop increase associated with the insertion of the treatment means 52 into such fluid circuit. The fan inlet is fluidically connected to the connecting conduit 56 and the fan outlet is fluidically connected to the outlet conduit 40.

The fan 66 is powered by a motor 68 mounted on the outside of the housing and is connected thereto by leads, such as lead 70. The motor is powered from the electrical system of the internal combustion engine by leads, such as lead 72, and is controlled by a control system 74 via leads, such as lead 76. The control system will be discussed in detail below.

Operation of the apparatus 32 thus includes intercepting exhaust gases from the tailpipe before such gases are released to the atmosphere, treating such gases in treatment means 52, and decreasing the pressure drop associated with the apparatus 32 by operation of the fan 66.

The treatment means 52 can include chemical means common to the emissions control art such as indicated at 26 in FIG. 1, or it can include particulate means P such as sand. The treatment means can also include mechanical means such as baffles B having tortuous passages S or the like or can include padlike means M.

The control system 74 includes a pressure sensor, such as a pressure transducer or the like, placed in the exhaust manifold 18 and a control unit 80 connected to the pressure transducer by a lead 82 and to the motor 68 by the lead 76. The control unit 80 includes a microprocessor or the like so that as pressure in the exhaust manifold 18 changes, the fan motor 68 is operated accordingly to change the downstream pressure in the system associated with the fan 66 to maintain a desired and set pressure drop for the system as a whole. The control unit 80 can also be coupled to any other part of the system so that as the pressure in any part of the system changes, either due to clogging, age, or the like, the fan unit can be operated to compensate for such change in pressure drop characteristics.

The control unit can be preset or can be changed as necessary to accomplish the just-stated objectives.

It is to be understood that while certain forms of the present invention have been illustrated and described herein, it is not to be limited to the specific forms or arrangement of parts described and shown.

What is claimed is:

1. Apparatus for removing impurities from exhaust gases emitted by an internal combustion engine having an exhaust manifold into which engine exhaust gases are introduced for disposal, an exhaust pipe fluidically connected at an inlet end thereof to said exhaust manifold and having an outlet end, comprising
    (A) a primary emissions control system having a housing with an inlet end fluidically connected to said exhaust pipe outlet end, a catalyst material therein through which engine exhaust gases from said exhaust pipe flow, and an outlet end,
    (B) a tailpipe having an inlet end fluidically connected to said primary emissions control system outlet end;
    (C) a releasable coupling on said tailpipe adjacent to said tailpipe outlet;
    (D) an inlet conduit having an inlet end fluidically connected to said tailpipe outlet by said releasable coupling and an outlet; and
    (E) apparatus which cleans gases exhausted from said primary emissions control system and which includes
        (1) a tubular housing having an inlet fluidically connected to said inlet conduit outlet and receiving exhaust gases therefrom,
        (2) a central chamber defined in said tubular housing, said inlet conduit extending into said tubular housing central chamber,
        (3) exhaust gas treatment means in said central chamber, said exhaust gas treatment means including a cartridge,
        (4) first coupling means releasably connecting said cartridge to said inlet conduit,
        (5) a connecting conduit in said central chamber,
        (6) a second coupling means releasably connecting said cartridge to said connecting conduit, and
        (7) an exhaust gas flow control means in said central chamber and which is connected to said connecting conduit, said exhaust gas flow control means including
            (a) a fan having an inlet thereof fluidically connected to said connecting conduit and an outlet,
            (b) an exhaust conduit extending into said central chamber and having an inlet fluidically connected to said fan outlet and an outlet to atmosphere,
            (c) a motor mounted on said tubular housing and powering said fan, said motor being connected to an electrical system of the internal combustion engine, and
            (d) a control system connected to said fan motor and including a pressure sensor located in said engine exhaust manifold, a microprocessor connected to said pressure transducer and to said fan motor and varying fan speed as gas pressure in the engine exhaust manifold varies, said control system maintaining a preset pressure drop between the engine exhaust manifold and atmosphere, and
        (8) an access door in said tubular housing adjacent to said cartridge, said access door being sized to permit said cartridge to move into and out of said tubular housing via said access door.

2. The apparatus defined in claim 1 wherein said exhaust gas treatment means includes a baffle means.

* * * * *